United States Patent [19]
Van

[11] Patent Number: 4,622,351
[45] Date of Patent: Nov. 11, 1986

[54] RUBBER-REINFORCED POLYMERIC RESINS CONTAINING A MINERAL FIBER

[75] Inventor: Dinh P. Van, Gent, Belgium

[73] Assignee: The Dow Chemical Company, Midland, Mich.

[21] Appl. No.: 702,111

[22] Filed: Feb. 15, 1985

[30] Foreign Application Priority Data

Feb. 21, 1984 [NL] Netherlands ............... 8400549

[51] Int. Cl.$^4$ .................. C08L 51/04; C08K 9/06; C08K 7/14; C08K 3/40

[52] U.S. Cl. ................... 523/212; 523/214; 523/220; 523/221; 524/493; 524/494; 524/566; 525/316

[58] Field of Search ............... 523/220, 221, 212, 214; 524/493, 494, 566; 525/316

[56] References Cited

U.S. PATENT DOCUMENTS

| | | | |
|---|---|---|---|
| 2,673,844 | 3/1954 | Gilcrease | 523/220 |
| 3,864,203 | 2/1975 | Marzocchi | 523/220 |
| 3,951,906 | 4/1976 | Farber et al. | 523/220 |
| 4,015,039 | 3/1977 | Segal et al. | 523/220 |
| 4,107,356 | 8/1978 | Ukihashi et al. | 523/220 |
| 4,187,260 | 2/1980 | Kruse et al. | 525/263 |
| 4,252,911 | 2/1981 | Simon | 525/316 |
| 4,254,236 | 3/1981 | Burk | 525/316 |
| 4,293,233 | 9/1981 | Binsack et al. | 524/494 |
| 4,455,398 | 6/1984 | Budich et al. | 523/220 |
| 4,524,160 | 6/1985 | Maeda et al. | 523/220 |

FOREIGN PATENT DOCUMENTS

| | | | |
|---|---|---|---|
| 0007810 | 2/1980 | European Pat. Off. | 525/316 |
| 00103657 | 3/1984 | European Pat. Off. | 525/316 |
| 1250117 | 9/1967 | Fed. Rep. of Germany | 524/494 |
| 2611974 | 9/1977 | Fed. Rep. of Germany | 523/220 |
| 1301166 | 12/1972 | United Kingdom | 525/316 |

*Primary Examiner*—Herbert J. Lilling

[57] ABSTRACT

The physical properties of a rubber-reinforced polymer resin are enhanced by the addition of glass fibers having a diameter which is less than 20 times greater than the volume average particle size of the disperse rubber particles in the reinforced polymer resin.

14 Claims, No Drawings

4,622,351

RUBBER-REINFORCED POLYMERIC RESINS CONTAINING A MINERAL FIBER

FIELD OF THE INVENTION

The present invention relates to rubber-reinforced polymer resins containing a mineral fiber and to a method for preparing these resins.

BACKGROUND OF THE INVENTION

Due to their desirable physical properties such as strength and toughness (i.e., the combination of elongation and impact strength), rubber-reinforced polymer resins derived from styrene, or derivatives of styrene, and optionally, one or more comonomers, are employed in a variety of commercial applications such as packaging, refrigerator linings, furniture, casings for domestic appliances and toys. The rubber-reinforced, styrenic polymer resins generally comprise discrete particles of rubber, e.g., cross-linked polybutadiene or a block copolymer of butadiene and styrene, dispersed throughout a polymer matrix of styrene (conventionally referred to as high impact polystyrene or HIPS) or a polymer matrix of a copolymer of styrene and acrylonitrile (conventionally referred to as ABS).

Due to the physical property requirements of many end-use applications, it is often desirable to increase the physical properties, such as the heat distortion temperature and tensile properties, of the rubber-reinforced resins. It is known that the high temperatue properties as well as the tensile properties of the rubber-reinforced styrenic polymer resins can be improved by incorporating a mineral fiber such as chopped glass fiber in the resin product. Unfortunately, the enhanced tensile and high temperature properties imparted to the styrenic resin by the glass fibers or other mineral fibers are typically accompanied by a coincident and significant reduction in impact strength. This reduction in impact strength is particularly evident when the glass fiber is employed to reinforce a rubber-reinforced styrenic polymer resin.

In view of this stated deficiency in the polymeric resin products of the prior art reinforced with a mineral fiber, it remains highly desirable to provide a styrenic polymer resin reinforced with a mineral filler which mineral reinforced resin exhibits an improved balance of physical properties.

SUMMARY OF THE INVENTION

Accordingly, in one aspect, the present invention is a composite comprising a resin of a polymer of one or more monovinylidene aromatic compound(s) having discrete particles of a rubber and mineral fiber dispersed throughout the polymer matrix phase of the resin wherein the ratio of the diameter of the mineral fiber to the volume average particle size of the disperse rubber particles is less than about 20:1.

Surprisingly, when the diameter of the mineral fiber and the volume average particle size of the rubber have a size ratio of 20:1 or less, the rubber particles and the mineral fibers cooperate to form a polymer resin having an enhanced combination of toughness and tensile properties. Specifically, the rubber/mineral-reinforced polymeric resins exhibit an exceptional balance of toughness, tensile strength and high temperature properties. Such surprising improvement in physical properties is particularly evident when the mineral fibers have at least some of the polymer of the matrix phase bonded (i.e., grafted) thereto, i.e., the polymer of the polymer matrix phase adheres to glass fibers.

Due to the outstanding combination of toughness, tensile strength and high temperature properties, the polymers of the present invention are usefully employed in a wide variety of applications, such as automotive products, molded cases for household goods and appliances and other engineering applications. The mineral/rubber-reinforced polymer resins of the present invention are particularly useful in the preparation of automotive parts.

DETAILED DESCRIPTION OF THE INVENTION

The polymer matrix phase of the composite of the present invention is generally derived from one or more monovinylidene aromatic compounds. Representative monovinylidene aromatic compounds include styrene, alkyl-substituted styrenes such as $\alpha$-alkyl-styrenes (e.g., $\alpha$-methyl-styrene and $\alpha$-ethyl styrene) and ring-substituted styrenes (e.g., vinlytoluene, particularly p-vinyltoluene, o-ethyl-styrene and 2,4-dimethyl-styrene); ring-substituted halo-styrenes such as chloro-styrene and 2,4-dichloro-styrene; styrene substituted with both a halo and an alkyl group such as 2-chloro-4-methyl-styrene and vinylanthracene. In general, the preferred monvinylidene aromatic compound employed in preparing the polymer matrix phase is styrene or a combination of styrene and $\alpha$-methyl-styrene (advantageously, from about 10 to about 50, more advantageously from about 15 to about 40, weight percent of the toal weight of the styrene and $\alpha$-methyl-styrene being $\alpha$-methyl-styrene); with styrene being the most preferred monovinylidene aromatic compound.

Optionally, the monovinylidene aromatic can be copolymerized with one or more other comonomers to form the polymer matrix phase. Representative of such other comonomers include the unsaturated nitriles such as acrylonitrile, ethacrylonitrile, methacrylonitrile and mixtures thereof; the $\alpha,\beta$-ethylenically unsaturated carboxylic acids and esters thereof such as acrylic acid, methacrylic acid, methylacrylate, methylmethacrylate, ethylacrylate and 2-ethylhexylacrylate; the acid anhydrides such as maleic anhydride; the ethylenically unsaturated amides such as acrylamide and methacrylamide; divinyl aromatic compounds such as divinylbenzene; vinylidene chloride and vinylidene bromide and vinyl esters such as vinyl acetate.

Conventionally, the continuous polymer matrix phase is often prepared from at least one monovinylidene aromatic and at least one unsaturated nitrile. Preferred of the unsaturated nitriles is acrylonitrile. In preparing said copolymer matrix, the amounts of the monovinylidene aromatic compound and unsaturated nitrile most advantageously employed will vary depending on the physical and chemical properties desired in the final mineral/rubber-reinforced product. In general, the copolymer matrix will advantageously comprise from about 5 to about 35, preferably about 15 to about 25, weight percent of the unsaturated nitrile and from about 95 to about 65, preferably from about 85 to about 75 weight percent of the monovinylidene aromatic, said weight percents being based on the total amount of monovinylidene aromatic and unsaturated nitrile.

If employed, any of the comonomers other than an unsaturated nitrile will generally be employed in amounts less than about 10, more generally less than about 5, weight percent based on the total weight of the monomers employed in preparing the continuous polymer matrix phase of the mineral-reinforced styrenic polymer resin.

In the practice of the present invention, the mineral fiber is incorporated within a rubber-reinforced polymer resin (i.e., a polymer resin having discrete particles of a rubber dispersed throughout the polymer matrix phase). Rubbers useful in preparing rubber-reinforced polymer resin are well-known in the art and reference is made thereto for the purposes of the present invention. Advantageously, the rubber employed in preparing said rubber-reinforced product is a homopolymer or a copolymer of an alkadiene which exhibits a second order transition temperature not higher than about 0° C. and preferably not higher than about −20° C. as determined by conventional methods, e.g., ASTM Test Method D-746-52T. A copolymer of ethylene, propylene and optionally, a non-conjugated diene can also be employed. Preferably, the rubber is a homopolymer of a 1,3-conjugated diene such as butadiene, isoprene, piperylene, chloroprene or a copolymer of said conjugated dienes with a monovinylidene aromatic compound such as styrene (which is generally chemically bonded in blocks or grafted branches to the alkadiene polymer); an α-ethylenically unsaturated nitrile such as acrylonitrile or an α-olefin such as ethylene or propylene. For the purposes of this invention, in a copolymer of an alkadiene and other polymerized comonomer (e.g., polymerized monovinylidene aromatic and/or unsaturated nitrile), only the polymerized alkadiene is considered to be rubber and any blocks or grafted branches of the other polymerized monomer are not considered to be rubber but polymer bonded to the rubber. Although the rubber may contain a small amount of cross-linking agent, excessive cross-linking can result in the loss of the rubbery characteristics of the rubber.

Preferred rubbery polymers are the homopolymers of 1,3-butadiene and block or graft copolymers of at least about 55, more preferably from about 65 to about 85, weight percent, 1,3-butadiene and up to about 45, more preferably from about 15 to about 35, weight percent of a monovinylidene aromatic compound, preferably styrene. The rubber is advantageously employed in an amount such that the rubber-reinforced product contains from about 3 to about 20 weight percent rubber. A rubber-reinforced product having from about 5 to about 15 weight percent rubber, based on the total weight of the rubber-reinforced polymer, is preferred.

In the preparation of the rubber-reinforced polymer resin, the dispersed rubber particles are prepared at a particle size which imparts the desired properties to the polymer matrix. Although this will vary depending on the method by which the rubber-reinforced polymer is prepared, in general, the rubber particles reinforcing the polymeric resin will generally exhibit a volume average particle size of from about 0.1 to about 20 micrometers. Advantageously, the rubber particles will exhibit a volume average particle size from about 0.6 to about 10 micrometers, preferably from about 0.8 to about 5 micrometers.

Methods for the preparation of rubber-reinforced polymer resins are well known in the art and reference is made thereto for the purposes of the present invention. Representatives of such methods include mass polymerization techniques such as described in U.S. Pat. Nos. 2,727,884 and 3,488,744; a combination of mass and suspension polymerization techniques and the so-called "emulsion" polymerization route wherein the rubber particles are prepared using emulsion polymerization. To obtain disperse rubber particles of a desired size, the rubber-reinforced polymer resins employed in the present invention are advantageously prepared using mass or mass/suspension techniques.

In general, mass polymerization involves polymerizing a solution of the rubber and monomer(s) at conditions sufficient to form discrete rubber particles of the desired particle size dispersed throughout the polymerized monomer. The polymerization is advantageously conducted in one or more substantially linear stratified flow or so-called plug-flow reactors such as described in U.S. Pat. No. 2,727,884 which may or may not comprise recirculation of a portion of the partially polymerized product or in a stirred tank reactor wherein the contents of the reactor are essentially uniform throughout.

The polymerization is advantageously conducted in an organic liquid reaction diluent such as aromatic or inertly substituted aromatic hydrocarbons (e.g., benzene or toluene) and in the presence of a free-radical initiator such as the peroxide initiators, (e.g., dibenzoyl peroxide or 1,1-bistertiarybutylperoxycyclohexane). In general, the initiator will be employed in an amount from about 100 to about 5000 weight parts per million weight parts of the monomers employed. The organic liquid reaction diluent is generally employed to control the viscosity of the polymerization mixture and is generally employed in an amount from about 2 to about 20 weight percent based on the total weight of the rubber, monomer and diluent. The polymerization mixture can further contain other adducts such as a plasticizer or lubricant (e.g., mineral oil); and antioxidant (e.g., an alkylated phenol such as di-tertbutyl-p-cresol); a polymerization aid (e.g., a chain tranfer agent such as an alkyl mercaptan) or a mold release agent, (e.g., zinc stearate). Temperatures at which polymerization is normally conducted are dependent on the specific components employed but will generally vary from about 60° to about 190° C.

In the preparation of the rubber-reinforced polymer resin, the mass polymerization can be continued to the desired completion and then treated to remove any unreacted monomer such as by flashing off the monomer and other volatiles at an elevated temperature under vacuum.

Mass/suspension polymerization involves initially mass polymerizing the monomer/rubber mixture and, following phase inversion (i.e., the conversion of the polymer from a discontinuous phase dispersed in a continuous phase of the rubber through the point where there is no distinct continuous or discontinuous phase in the polymerization mixture to a continuous polymer phase having the rubber dispersed therethrough) and subsequent size stabilization of the rubber particles, suspending the partially polymerized product, with or without additional monomer(s), in an aqueous medium which generally contains a polymerization initiator. Subsequently, polymerization is completed using suspension polymerization techniques.

The mineral fibers advantageously employed in the practice of the present invenion include fibers of graphite, mica and glass. Other mineral fibers such as fibers of titanium dioxide or potassium titanate can also, but less preferably, be employed. The most preferred mineral fiber is glass fiber. Preferably, provided the diameter is not sufficiently large to exceed the ratio hereinbefore specified, the mineral fiber has a diameter from about 1 to about 100, more preferably from about 5 to about 50 micrometers. In a preferred embodiment, chopped glass fibers having a length from about 1 to about 20, preferably from about 2 to about 10, most preferably from about 3 to about 6, millimeters and a diameter from about 5 to about 20, preferably from about 8 to about 15, micrometers are employed. In any specific application, the diameter of the glass employed is such that the diameter of the glass fibers to the volume average particle size of the rubber particles is preferably less than about 18:1, more preferably less than about 12:1.

The amount of mineral fiber employed in preparing the composites of the present invention is dependent on a variety of factors including the desired properties of the fiber/rubber reinforced polymer resin and the specific mineral fiber and rubber-reinforced resin employed. In general, the composite will contain from about 1 to about 40, preferably from about 5 to about 30, weight percent of the mineral fiber based on the total weight of the fiber/rubber reinforced polymer resin. More preferably, the fiber/rubber reinforced polymer resin composes from about 10 to about 25 weight percent of the mineral fibers.

In the method of the present invention, the mineral fiber and the rubber-reinforced polymer resin are mixed at conditions to disperse the mineral fibers throughout the rubber-reinforced polymer resin. A preferred method for dispersing the glass fibers throughout the polymer resin is melt blending. The term "melt blending" is used conventionally herein and refers generally to blending of the polymer resin in a molten or liquid state with the mineral fiber. In one method for melt blending the fibers with the rubber-reinforced polymer resin, the mineral fibers can be added to the polymerization mixture following complete polymerization but prior to removal of the unconverted monomer(s) and other volatiles therefrom since the polymerization mixture is in a molten state at that point. Subsequently, the monomer(s) and other volatiles can be removed from the mineral fiber reinforced styrenic polymer resin and the resin converted to the desired shape and size such as pellets. In another method for melt blending the fiber with the resin, the molten polymerization mixture can be blended with the mineral fiber after removal of the unconverted monomer(s) and other volatiles but prior to final quench and pelletizing. In yet another method, a melt of the fully prepared resin (i.e., following quench) can be prepared and the fiber subsequently blended with the melt. In addition, in an injection molding operation, the polymer resin can be fed directly to the injection molding apparatus heated to a molten condition, mixed with the mineral fiber and thereafter molded into a desired shape and size.

In general, the most desirable of physical properties are exhibited when the mineral fiber and resin are melt blended at conditions such that at least some of the continuous phase of polymer is bonded to the mineral fiber. To promote this chemical bonding (i.e., grafting) of the polymer of the matrix phase to a silicon containing mineral fiber (i.e., mica, glass or silica), the mineral fiber is advantageously coated with a coupling agent which acts to couple the mineral fiber with the polymer matrix phase of the resin during the melt blending operation. Coupling agents advantageously employed herein include silane materials which contain a group reactive with the polymer of the matrix phase, e.g., an ethylenic unsaturation which is capable of reacting with the polymer of the matrix phase, thereby bonding the matrix polymer to the mineral fiber. Hereinafter, coupling agents containing the reactive groups are referred to as "reactive silanes". Representative reactive silanes include trihalovinyl silanes as represented by the general structural formula:

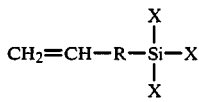

wherein X is a halo, preferably chloro and R is a hydrocarbon, an inertly substituted hydrocarbon or covalent bond (e.g., vinyltrichloro silane); the vinylalkoxy silanes as represented by the general structure of formula:

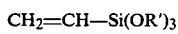

wherein R' is an alkyl, preferably an alkyl having from to 1 to about 4 carbon atoms or an alkoxy group (e.g., vinyltriethoxy silane and methyltris α-methoxy-ethoxy silane); the vinylester silanes such as vinyltriacetoxy silane; the acrylic silanes such as methacryloxyalkyl silane and cationic vinylbenzyl trimethoxy silane. Of the reactive silanes, vinyltriethoxy silane and cationic vinylbenzyl trimethoxy silane are preferred.

A representative coupling agent, useful with titanate fibers is isopropyl triisostearyl titanate. Alternatively, the grafting of the polymerized monovinylidene aromatic to a graphite fiber is promoted by the oxidative treatment of the fiber such as by wet, dry or electrochemical oxidation.

The mineral fiber is preferably coated with the coupling agent or otherwise treated prior to the blending operation. Although the temperatures at which melt blending take place are dependent on a variety of factors including specific polymer resin and mineral fiber, including the coupling agent (if any) employed, in general melt blending is conducted at temperatures from about 180° C. to about 260° C. Preferably, the melt blending of the mineral fiber and polymer resin is conducted at temperatures from about 200° C. to about 250° C.

EXAMPLES

The following examples are set forth to illustrate the advantages of the present invention and should not be construed to limit its scope. In the Examples, all parts and percentages are by weight unless otherwise indicated.

EXAMPLE 1

An ABS type polymer resin is prepared using the techniques of European Patent Application No. 82.201 156.5. The ABS resin comprises a continuous copolymer phase consisting of 78 percent of polymerized styrene and 22 percent of polymerized acrylonitrile. Dispersed throughout the continuous copolymer matrix are discrete rubber particles of a polybutadiene rubber having a volume average particle size of 1.2 micron.

A portion of the ABS resin is melt blended with a glass fiber coated with a reactive vinyl silane available as 414X7 from Owens-Corning Fiberglass having a diameter of about 10 micrometers and a length of from 4.5 to 6 millimeter (mm). The melt blending operation was conducted using a screw extruder; the polymer having an inlet temperature of 200° C. and an outlet temperature of 250° C.

EXAMPLE 2

Using the techniques of Example 1, an identical composite of an ABS resin and glass fibers is prepared except that sized glass fibers used, the fibers being available as 885ZZ from Owens-Corning Fiberglass.

EXAMPLE 3

An ABS resin comprising a disperse rubber phase of rubber particles having a volume average particle size of 0.65 micrometers is prepared and subsequently melt blended with vinyl silane coated glass fibers available as 414X7 from Owens-Corning Fiberglass using the techniques of Example 1.

COMPARATIVE EXAMPLE 1

An ABS resin is prepared wherein the rubber particles are prepared using emulsion polymerization techniques. The resulting ABS resin has the identical composition to that of Example 1 except that the volume average particle size is only 0.2 micron.

Using the techniques of Example 1, this ABS resin is melt blended with a glass fiber.

COMPARATIVE EXAMPLE 2

An ABS resin is prepared using the techniques of Example 1. The resulting resin comprises a continuous copolymer phase of 78 percent of polymerized styrene and 22 percent of polymerized acrylonitrile and a disperse rubber phase having a volume average particle size of 1.2 micron.

COMPARATIVE EXAMPLE 3

Using the techniques of Example 1, a polymer resin is prepared composed of a copolymer matrix of 75 percent polymerized styrene and 25 percent polymerized acrylonitrile. The resulting resin is melt blended with glass fiber available as 414X7 from Owens-Corning Fiberglass using the techniques of Example 1.

COMPARATIVE EXAMPLE 4

Using the techniques of Example 1, an ABS resin is prepared composed of a copolymer matrix of 78 percent polymerized styrene and 22 percent polymerized acrylonitrile and disperse rubber phase having a volume average particle size of 0.65 micron.

The high temperature properties, tensile properties and impact strength of the composites of Examples 1, 2, 3 and 4 and Comparative Examples 1, 2, 3 and 4 were measured and set forth in Table I.

TABLE I

| | Ex. 1 | Ex. 2 | Comparative Ex. 1* | Comparative Ex. 2* | Comparative Ex. 3* | Ex. 3 | Comparative Ex. 4* |
|---|---|---|---|---|---|---|---|
| Composite Rubber[1] | | | | | | | |
| Concentration, % | 10 | 10 | 10 | 10 | — | 10 | 10 |
| Particle Size, μm | 1.2 | 1.2 | 0.2 | 1.2 | — | 0.65 | 0.65 |
| Glass Fiber | | | | | | | |
| Concentration, % | 20 | 20 | 20 | — | 20 | 20 | — |
| Diameter, μm | 10 | 10 | 10 | — | 10 | 10 | — |
| Graft level, %[2] | 18.2 | 8.7 | 18.7 | — | 18.5 | 18.7 | — |
| Glass Fiber Diameter: Rubber Particle Size | 8:1 | 8:1 | 50:1 | — | — | 15:1 | — |
| High Temperature Properties[3] | | | | | | | |
| Vicat, °C. | | | | | | | |
| ASTM | 121 | 112 | 119 | 110 | 119 | 119 | 109 |
| DIN | 109 | 102 | 107 | 102 | 108 | 108 | 101 |
| HDT °C. | 103 | 101 | 102 | 80 | 102 | 103 | 80 |
| Tensile Properties[4] | | | | | | | |
| Tensile Yield, N/mm² | 78 | 65 | 105 | 42 | 105 | 85 | 47 |
| Elongation, % | 1–2 | 1–2 | 1–2 | 40 | 1–2 | 1–2 | 15 |
| Flexural Mod, N/mm² | 5800 | 4500 | 8000 | 2100 | 8700 | 6200 | 2600 |
| Impact Strength[5] | | | | | | | |
| Izod, J/m | | | | | | | |
| 20° C. | 144 | 120 | 64 | 230 | 58 | 104 | 171 |
| −20° C. | 123 | 100 | 58 | 175 | 56 | 88 | 86 |
| Charpy, KJ/m² | | | | | | | |
| 20° C. | 10.7 | 9.8 | 5 | 15 | 5.1 | 8.6 | 11 |
| −20° C. | 10.2 | 9.2 | 4.8 | 12 | 5 | 7 | 7 |

*Not an example of the present invention

[1]The rubber particle size of the dispersed rubber phase of the rubber-reinforced ABS resin is set forth in micrometers (μm) as measured using a commercially available particle size analyzer (e.g., a Coulter Counter) supplemented as necessary by visual phase contrast microscopy. The diameter of the glass fiber is set forth in micrometers and is that diameter specified by manufacturer of the glass which, in these Examples, was Owens-Corning Fiberglass.

[2]For the purposes of this invention, the graft level is the amount of monovinylidene aromatic polymer bonded to the mineral fiber. The graft level is determined using selective extraction techniques (e.g., first extracting the free polystyrene with methyl ethyl ketone, acetone or a mixture thereof) to obtain a product containing the rubber and mineral fibers plus any polymer bonded to the rubber and mineral fibers and then burning off the rubber and any polymer bonded to the rubber and mineral fiber. To compensate for the rubber and polymer grafted thereto, the amounts of alkadiene and polymer bonded thereto are determined on a sample of

TABLE I-continued

|  | Ex. 1 | Ex. 2 | Comparative Ex. 1* | Comparative Ex. 2* | Comparative Ex. 3* | Ex. 3 | Comparative Ex. 4* |
|---|---|---|---|---|---|---|---| the rubber-reinforced polymer resin prior to blending with the mineral fiber. This is achieved using selective extraction techniques to extract the free polymer from the rubber reinforced resin. The amount of polymer bonded to the mineral fiber is then determined from the total weight of the sample extracted from the glass/rubber reinforced rubber resin less the weight of the mineral fiber (i.e., the weight of the burnt sample) and the amount of rubber and polymer grafted thereto. The amount of polymer bound to the mineral fiber is advantageously at least about 8, preferably at least about 10, more preferably at least about 15, weight percent based on the total weight of the mineral fiber and the polymer bound thereto when the graft content is measured using the described techniques. The reinforcing effect of the mineral fiber is enhanced when these amounts of polymer are bound to the mineral fibers whether the resin prepared from the monovinylidene aromatic compound is a rubber-reinforced polymer resin or a polymer resin having no rubber reinforcement.
[3] The high temperature properties of the composite are indicated by the Vicat and the Heat Distortion Temperature. The Vicat is measured using the test method described by ASTM D-1525 and DIN test measured method 53460. The heat distortion temperature was measured by using DIN test method 53461.
[4] Tensile properties were measured using the test method of ASTM-D-638 on samples which were injection molded at a melt temperature of 250° C. The tensile yield and flexural modulus are expressed in Newtons per square millimeter ($mm^2$) and elongation being the elongation at break expressed as a percentage of the original length.
[5] Izod impact strength is the notched Izod impact expressed in Joules/meter (J/m) measured using the test method described by ASTM D-256 on test specimens which were injection molded as described in footnote 3. Charpy impact strength, expressed in kilojoules per square meter ($Kj/m^2$) is measured using the test method of DIN 53-453 on injection molded samples molded at a mold temperature of 50° C. and a melt temperature of 250° C. Both Charpy and Izod testing was conducted at both room temperature and −20° C.

EXAMPLE 4

An ABS resin is prepared having a copolymer matrix phase consisting of 83 percent styrene in polymerized form and 17 percent acrylonitrile in polymerized form and having discrete rubber particles of a polybutadiene rubber having a volume average particle size of 3.5 micrometer dispersed throughout the continuous polymer matrix phase. The disperse rubber phase comprises 6 percent of the total weight of the resin.

Using the techniques of Example 1, a composite is prepared by melt blending the resulting ABS resin with 414X7 reactive vinyl silane coated glass fibers available from Owens-Corning.

EXAMPLE 5

Using the techniques of Example 4, an identical composite of an ABS resin and glass fibers is prepared except that sized 885ZZ glass fibers available from Owens-Corning are employed.

COMPARATIVE EXAMPLE 5

An ABS resin is prepared by the methods of Example 1 containing a copolymer matrix phase of 83 percent of polymerized styrene and 17 percent of polymerized acrylonitrile and a disperse rubber phase having a volume average particle size of 3.5 micron.

The high temperature properties, tensile properties and impact strength of the composites of Examples 4 and 5 were measured and are set forth in Table II. For purposes of comparison, the properties of Comparative Examples 1 and 5 are also set forth in Table II.

TABLE II

|  | Example 4 | Example 5 | Comparative Example 1* | Comparative Example 5* |
|---|---|---|---|---|
| Composite Rubber[1] |  |  |  |  |
| Concentration, % | 6 | 6 | 10 | 6 |
| Particle Size, μm | 3.5 | 3.5 | 0.2 | 3.5 |
| Glass Fiber |  |  |  |  |
| Concentration, % | 20 | 20 | 20 | — |
| Diameter, μm | 10 | 10 | 10 | — |
| Graft level, %[2] | 18.5 | 8.5 | 18.5 | — |
| Glass Fiber Diameter: Rubber Particle Size | 3:1 | 3:1 | 50:1 | — |
| High Temperature Properties[3] |  |  |  |  |
| Vicat, °C. |  |  |  |  |
| ASTM | 111 | 105 | 119 | 112 |
| DIN | 98 | 94 | 107 | 92 |
| HDT °C. | 93 | 92 | 102 | 76 |
| Tensile Properties[4] |  |  |  |  |
| Tensile Yield, N/mm² | 75 | 50 | 105 | 30 |
| Elongation, % | 2-3 | 2-3 | 1-2 | 40 |
| Flexural Mod, N/mm² | 5800 | 4200 | 8000 | 1800 |
| Impact Strength[5] |  |  |  |  |
| Izod, J/m |  |  |  |  |
| 20° C. | 115 | 75 | 64 | 90 |
| −20° C. | 90 | 75 | 58 | 70 |
| Charpy, KJ/m² |  |  |  |  |
| 20° | 10.6 | 7.2 | 5 | 7.5 |
| −20° | 8.2 | 6.8 | 4.8 | 6 |

*Not an example of the present invention
[1] Same as Footnote 1 in Table I
[2] Same as Footnote 2 in Table I
[3] Same as Footnote 3 in Table I
[4] Same as Footnote 4 in Table I
[5] Same as Footnote 5 in Table I As evidenced by the data set forth in Table II, the composites of the present invention possess an exceptional combination of impact strength, tensile and high temperature properties. Specifically, even at a lower concentration of rubber, the composite of Examples 4 and 5, which contain only 6 percent rubber, exhibit significantly higher impact strengths than the composite of Comparative Example 1 which contains 10 percent rubber and equivalent amounts of glass fibers. Moreover, the high temperature properties are significantly greater than the rubber-reinforced polymer containing no glass fiber reinforcement. It is also evident that the bonding of the polymerized monovinylidene aromatic polymer to the mineral fiber during the melt blending operation further enhances the balance of high temperature and impact properties.

What is claimed is:

1. A composite comprising a resin of a polymer of one or more monovinylidene aromatic compound(s) having discrete particles of a rubber and mineral fiber, having a diameter from about 1 to about 100 micrometers, dispersed throughout the polymer matrix phase of the resin wherein the ratio of the dimaeter of the mineral fiber to the volume average particle size of the disperse rubber particles is less than about 20:1.

2. The composite of claim 1 wherein the ratio of the diameter of the mineral fiber to the volume average particle size of the disperse rubber phase is less than about 12:1.

3. The composite of claim 2 wherein the mineral fiber is a glass fiber.

4. The composite of claim 3 wherein the glass fiber has a diameter of from about 1 to about 100 micrometers and a length from about 1 to about 20 millimeters.

5. The composite of claim 4 wherein the composite comprises from about 5 to about 30 weight percent of glass fibers having a diameter from about 5 to about 50 micrometers.

6. The composite of claim 1 wherein the monovinylidene aromatic compound employed in preparing the polymer matrix phase is styrene, an alkyl substituted styrene or mixtures thereof.

7. The composite of claim 1 wherein the polymer matrix phase is a copolymer of styrene and acrylonitrile.

8. The composite of claim 6 wherein the disperse rubber particles exhibit a volume average particle size of from about 0.1 to about 20 micrometers.

9. The composite of claim 1 wherein the disperse rubber particles exhibit a volume average particle size of from about 0.6 to about 10 micrometers and the composite comprises from about 5 to about 15 weight percent rubber, based on the total weight of the rubber reinforced polymer and from about 10 to about 25 weight percent of a mineral fiber having a diameter of from about 5 to about 50 micrometers and the ratio of the diameter of the glass fiber to the volume average particle size of the rubber is less than about 12:1.

10. The composite of claim 1 wherein the mineral fibers have at least some of the polymer matrix phase bonded thereto.

11. The composite of claim 1, wherein the polymer resin employed is prepared by mass polymerization.

12. The composite of claim 1, wherein the polymer resin employed is prepared by mass/suspension polymerization.

13. The composite of claim 10, wherein the mineral fibers are coated with a coupling agent which acts to bond the mineral fiber with the polymer matrix phase of the resin.

14. The composite of claim 11, wherein the coupling agent contains reactive silanes.

* * * * *